(12) United States Patent
Avci et al.

(10) Patent No.: US 7,837,776 B2
(45) Date of Patent: Nov. 23, 2010

(54) COMPOSITIONS USEFUL TO PROVIDE IMPROVED RHEOLOGY AND MIST CONTROL TO INK FORMULATIONS AND INK FORMULATIONS CONTAINING SUCH COMPOSITIONS

(75) Inventors: Sel Avci, Kendall Park, NJ (US); Dan Merchant, East Brunswick, NJ (US)

(73) Assignee: Elementis Specialties, Inc., Highstown, NJ (US)

( * ) Notice: Subject to any disclaimer, the term of this patent is extended or adjusted under 35 U.S.C. 154(b) by 0 days.

(21) Appl. No.: 12/414,319

(22) Filed: Mar. 30, 2009

(65) Prior Publication Data

US 2009/0183649 A1 Jul. 23, 2009

Related U.S. Application Data

(62) Division of application No. 11/088,147, filed on Mar. 23, 2005.

(51) Int. Cl.
*C09D 11/00* (2006.01)
(52) U.S. Cl. .................. 106/31.58; 106/31.86; 106/316
(58) Field of Classification Search .............. 106/31.58, 106/31.86, 316
See application file for complete search history.

(56) References Cited

U.S. PATENT DOCUMENTS

| 2,482,760 | A | 9/1949 | Goebel |
| 2,482,761 | A | 9/1949 | Goebel |
| 2,731,481 | A | 1/1956 | Harrison et al. |
| 2,793,219 | A | 5/1957 | Barrett et al. |
| 2,964,545 | A | 12/1960 | Harrison |
| 3,157,681 | A | 11/1964 | Fischer |
| 3,256,304 | A | 6/1966 | Fischer et al. |
| 4,475,950 | A | 10/1984 | Finlayson |
| 5,420,229 | A * | 5/1995 | Burke et al. ................. 528/335 |
| 5,429,999 | A | 7/1995 | Nae et al. |
| 5,536,871 | A | 7/1996 | Santhanam |
| 5,610,110 | A | 3/1997 | Azema et al. |
| 5,718,841 | A | 2/1998 | Mardis et al. |
| 5,735,943 | A | 4/1998 | Cody et al. |
| 2001/0009890 | A1 | 7/2001 | Patel et al. |
| 2004/0102332 | A1 | 5/2004 | Thompson et al. |
| 2005/0020718 | A1* | 1/2005 | Gosse et al. ................. 523/105 |
| 2005/0267231 | A1* | 12/2005 | Pavlin ......................... 523/102 |

OTHER PUBLICATIONS

J.W. Jordon, "Organophilic Clay-Base Thickeners", Proceedings of the 10th National Conference on Clays and Minerals, 1963.

* cited by examiner

*Primary Examiner*—Jerry Lorengo
*Assistant Examiner*—Veronica Faison Gee
(74) *Attorney, Agent, or Firm*—Morgan, Lewis & Bockius LLP

(57) ABSTRACT

The invention is ink formulations that show improved rheological and antimisting properties. The invention is particularly useful in lithographic inks including heatset, sheetfed and UV curable lithographic inks. The invention also includes novel additive that enable the preparation of inks with required viscosities that are needed to perform on high-speed printing presses with improved performance. The additive is based on reaction products of polyamines and carboxylic acids with two or more carboxylic moieties mixed or combined with tridecyl alcohol. In addition, the inventive additive is in the form of liquid and it is pourable and pumpable for ink manufacturing processes.

5 Claims, No Drawings

COMPOSITIONS USEFUL TO PROVIDE IMPROVED RHEOLOGY AND MIST CONTROL TO INK FORMULATIONS AND INK FORMULATIONS CONTAINING SUCH COMPOSITIONS

CROSS REFERENCE TO RELATED APPLICATIONS

This application is a divisional application of U.S. patent application Ser. No. 11/088,417, filed Mar. 23, 2005, which is incorporated herein by reference in its entirety.

FIELD OF THE INVENTION

This invention relates to compositions suitable for use as additives for ink, and to ink formulations comprising said compositions. The invention particularly relates to additives that provide improved rheological properties to lithographic printing inks, sheetfed, heatset and UV curable offset ink formulations. The rheological additive is pourable and pumpable, thereby making it easy to use it in mechanical or automated ink manufacturing processes.

BACKGROUND OF THE INVENTION

It is well known that the printing inks utilized today are modified with various types of rheological additives to provide required rheological properties to ensure quality printing on high speed printing presses. Generally, polymer (or resin), solvent and pigment types determine the intrinsic rheology of the ink formulation. Ideally, the formulators hope to achieve all the rheological properties from the resin system they choose. However, to fine tune the rheology and improve overall performance properties of their inks, formulators most often seek "rheological additives." The rheological modifiers are one of the most important additives utilized in printing ink formulations. The additives are utilized to modify the rheological properties of printing inks to meet the requirements of various types of printing presses. It has been long known that organoclays have been used to control rheology and reduce ink misting on high speed presses. The assignee hereof has long offered a line of products sold under the trademark BENTONE® to ink manufacturers.

It has been long known, since at least the 1950s, that organoclays (also called organophilic clays) can be used to thicken ink systems. See the very early article by an employee of the assignee hereof J. W. Jordan, "Proceedings of the 10th National Conference on Clays and Clay Minerals" (1963), which discusses a range of applications of organoclays from high polarity liquids to low polarity liquids. See also U.S. Pat. No. 4,475,950.

U.S. Pat. Nos. 5,735,943; 5,718,841 and 5,429,999 describe the use of organoclays in various applications.

Organoclays are manufactured as dry powders and require significant processing on the part of the ink formulator/manufacturer to fully disperse and activate them into ink formulations. The dry powders are often very difficult to disperse in inks because of the need for high shear mixing equipment, increased temperatures and longer mixing conditions. In addition, the powdered materials require additional manpower to handle the bags to charge them into the ink mixing kettle which creates unhealthy dust conditions.

Ink manufacturers have long sought an easy to add, pumpable or pourable rheological additive which can be incorporated without handling dusty powders and requiring lengthy processing requirements. A liquid rheological additive would also be beneficial as a post additive to fine tune the viscosity of finished inks. There is clearly a need for a liquid rheological additive which can be utilized in an offset ink making process. The use of liquid rheological additive would allow the ink manufacturers to streamline the manufacturing process. As the ink manufacturing process changes toward faster throughput and full automation, the ink manufacturers demand easy to disperse, pumpable raw materials in their formulations so that lengthy processing and milling are eliminated.

Patents of the prior art that show developments related to the chemistry of additives useful in various fields, other than organoclays, include the following:

U.S. Patent Application Publication No. 2001/0009890 shows an invert emulsion suitable for drilling a subterranean well which uses an ester of a $C_1$ to $C_{12}$ alcohol and a $C_8$ to $C_{24}$ monocarboxylic acid; Ethomeen C/15 can be used as an agent in the invention described in the application.

U.S. Pat. No. 5,536,871 also issued to the assignee hereof describes a rheological additive which comprises the reaction product of a polyalkoxylated nitrogen-containing compound such as polyoxyethylene (5) cocoalkylamine, a polycarboxylic acid including dimer acids and a liquid diamine.

U.S. patent application Ser. No. 10/303,037, filed by assignee hereto, describes an additive that provides flat rheology to oil well drilling fluids, particularly those used in deep water drilling comprised of a reaction product of a carboxylic acid with at least two carboxylic acid moieties and a polyamine having an amine functionality of two or more.

U.S. Pat. No. 5,610,110 also issued to assignee hereof shows an improved drilling fluid containing a reaction product of an alkoxylated aliphatic amino compound and an organic polycarboxylic acid and a clay based organoclay.

SUMMARY OF THE INVENTION

The invention herein is directed to a liquid rheological additive for heatset, sheetfed and UV curable offset inks. The liquid rheological additive according to the present invention is pourable and pumpable at room or ambient temperature and can be incorporated into inks without the need of high shear mixing equipment and mills.

Stated another way, this invention provides a composition comprising the reaction product of a di-, tri- or polyamine with an acid containing at least two carboxyl functional groups to form a polyamide and as the second ingredient a low volatility liquid alcohol which has a water solubility of less than 10 mg/L at 25° C., which can be added to the polyamide before, during or after its synthesis or added to the ink as a separate component.

DETAILED DESCRIPTION OF PREFERRED EMBODIMENTS

An important embodiment of this invention relates to a composition which is a mixture or blend of (1) a reaction product of a specific polyamine and a carboxylic acid with at least two carboxylic moieties and (2) a low volatility liquid alcohol which has a water solubility of less than 10 mg/L at 25° C. In addition, the invention includes an ink fluid containing the above composition. The use of this unique mixture as an additive for an ink surprisingly improves the ink's rheological properties.

The additive comprises the following. First discussed are the components of the reaction product and its production.

Fatty Acids

Any carboxylic acid with at least two carboxylic moieties can be used for producing the reaction product component of the present invention. Dimer acids are preferred, dimer acids of $C_{16}$ and $C_{18}$ fatty acid are particularly preferred. Such dimer acids can be fully hydrogenated, partially hydrogenated, or not hydrogenated at all. Useful dimer acids include products resulting from the dimerization of $C_{16}$ to $C_{18}$ unsaturated fatty acids.

Generally when used, the dimer acids preferably have an average from about 18, preferably from about 28 to about 48 and more preferably to about 40 carbon atoms. Most preferably dimer acids have 32 to 36 carbon atoms.

Useful dimer acids are preferably prepared from $C_{18}$ fatty acids, such as oleic acids. Useful dimer acids are described in U.S. Pat. Nos. 2,482,760, 2,482,761, 2,731,481, 2,793,219, 2,964,545, 3,157,681, and 3,256,304, the entire disclosures of which are incorporated herein by reference.

Examples of most preferred dimer acids include the Empol® product line available from Cognis, Inc., Pripol™ dimer acids available from Uniqema and HYSTRENE® dimer acids formerly available from Humko Chemical.

It is recognized that commercially available dimer fatty acids contain a mixture of monomer, dimer, and trimer acids. Preferably, suitable dimer acid has a dimer content of at least 80%, more preferably above 90%.

Empol® 1061 with a dimer acid content of 92-96% is the preferred dimer acid for the present invention.

Polyamines

Polyamines having an amine functionality of two or more are used for the preparation of the reaction product of the present invention. Most preferably, polyamines from the family of polyethylene polyamines having an amine functionality of two or more should be used.

Di-, tri-, and polyamines and their combinations are most suitable for use in this invention. Representative such amines include ethylenediamine, diethylenetriamine, triethylenetetramine, tetraethylenepentamine and other members of this series. Branched polyamines and polyamines made with different alkyl groups may also be used.

Triamines are most preferable, particularly diethylenetramine (DETA). DETA has been assigned a CAS No. of 111-40-0. It is commercially available from Huntsman International and others.

Making the Reaction Product

Specifics on processing of polyamines and carboxylic acids are well known and can be used in making the reaction product of this invention. Preferably, the molar ratio between the amine functional group and carboxyl functional group is between 4:1 and 1:1. The preferred range is from 1:5:1.0 to 3:1, most preferably about 2:1. Mixtures of more than one dimer acid and/or more than one polyamine can be used. A representative manufacturing process is illustrated in the examples following hereafter. It should be noted that these reactions may generate imidazolines and other side products.

While the above is the preferred formulation, other compositions of varying molar ratios of raw materials can be used. Additionally, alternate commercial dimer fatty acids can be reacted with various amines to generate the reaction polymer.

Ink Formulations

In general, the printing ink compositions of the present invention comprise (a) at least one organic ink fluid vehicle broadly defined, (b) at least one additive as described, and (c) at least one color-imparting material, such as a pigment. The additive(s) is/are combined with the organic ink vehicle and pigment in sufficient concentration to provide a composition which exhibits desirable thixotropic properties as well as physical, chemical, and visual color characteristics suited to the intended application.

The organic ink vehicles usable as ink formulations of the present invention include various (a) ink oils generally and (b) ink systems containing organic resins and/or combinations thereof whatever kind used as commercial inks sold for all types of printing uses.

Examples of ink oils which are preferably used in the present invention include high boiling point petroleum derivative solvents and ink oils such as Magiesol 52, 47, and ink oil Magiesol 470. The solvent may be aliphatic, paraffinic or naphthenic in nature. The ink oils may include vegetable oils such as Soya, rapeseed, linseed oils which are hydrophobic and insoluble in water.

Example of ink resins and or combinations thereof include but are not limited to alkyds, hydrocarbon based resins, phenolic modified rosins and esters, polyesters, acrylated oligomers such as polyesters, urethanes and epoxy acrylates.

The color-imparting additives employable in ink compositions of the present invention include various pigments and/or pigment-containing pastes. Pre-dispersed pigment pastes generally comprise one or more colored pigments dispersed in a vehicle and/or solvent. The vehicle(s) employed in such pre-dispersed pigment paste may comprise one or more of the organic ink vehicles described herein as basic components of ink compositions of the present invention and/or other vehicles which differ from the above described organic ink vehicles.

Compatible Diluents

Critically important to this invention is that a low volatility liquid alcohol or glycol be mixed into or blended into the above discussed reaction product produced by the reaction of the carboxylic acid with the polyamine as described above or is otherwise added directly to the ink. Suitable low volatility liquid alcohols and glycols must have solubility in water of less than 10 mg/L. Suitable alcohols must be compatible with both the polyamide additive and the ink. Suitable alcohols or glycols should have viscosity reducing power when it is incorporated into polyamide so that the resultant product is pumpable and pourable. Suitable diluents should have low volatility and low odor.

TABLE 1

| Trade Name | Chemical Name | Boiling Pt. (° C.) | Melting Pt. (° C.) | Vapor Pressure (mm Hg @ 100° C.) | Water Solubility (mg/L) |
|---|---|---|---|---|---|
| Hexyl alcohol | Hexanol, branched and linear | 152-163 | −25.5 | 124 | 10,340-11,950 |
| Isoheptyl alcohol | Alcohols C6-C8, branched | 167-176 | −49.2 | 78 | 3,539-11,950 |

TABLE 1-continued

| Trade Name | Chemical Name | Boiling Pt. (° C.) | Melting Pt. (° C.) | Vapor Pressure (mm Hg @ 100° C.) | Water Solubility (mg/L) |
|---|---|---|---|---|---|
| Isooctyl alcohol | Alcohols C7-C9 iso, C8 rich | 185-193 | −117.2 | 27 | 1,379-1,485 |
| Nonanol | Nonanol | 192-204 | −5 | 22 | 156-572 |
| Isononyl acohol | Alcohols C8-10 iso, C9 rich | 203-215 | 64.5 | 16 | 164-614 |
| Isodecyl alcohol | Alcohols C9-11 iso, C10 rich | 217-224 | 34.3 | 8.2 | 75 |
| Tridecyl alcohol | Alcohols C11-14 iso C13 rich | 256-266 | 29.2 | 2.7 | 5.8 |
| 2-Octyl dodecanol | Alcohols C20 | 234-238 | −1 to +1 | NA | <10 |

The preferred alcohol is tridecyl alcohol also known as isotridecanol. This preferred alcohol is, for example, available from ExxonMobil Chemical under the trade name of Exxal 13.

Isotridecanol has the empirical formula $C_{13}H_{28}O$. Tridecyl alcohol is preferred due to its low water solubility. Tridecyl alcohol is also preferred because of its high boiling point and low volatility.

Tridecylalcohol is the preferred diluent due to its low volatility, compatibility, viscosity reducing properties and readily availability.

In a preferred embodiment, the reaction product and alcohol are mixed or blended in a weight ratio range of 95:5 to 5:95. The preferred ratio range of the two components is 80:20 to 30:70 and the most preferred ratio is 65:35.

Optional Components

Optionally, additional ingredients such as fatty amides and related alkoxylated derivatives can be blended into or reacted with the polyamide reaction product.

Suitable fatty amides, such as the Amid® product line by Akzo Nobel includes high melting temperature amides of fatty acids that are sparingly soluble in drilling muds. Additionally, alkoxylated fatty amides, such as the Ethomid® product line by Akzo Nobel can be used.

Organophilic Clays. Organoclays made from bentonite, hectorite and attapulgite clays can be added to the inventive ink formulation. There are a large number of suppliers of such clays in addition to Elementis Specialties' BENTONE® product line, including Rockwood Specialties, Inc. and Sud Chemie GmbH. Although organoclay can be a useful component, it is not a necessary component of the ink. If used, however, the preferred organoclays are BENTONE 760, BENTONE 500, and BARAGEL 3000, all available from Elementis Specialties, Inc.

Blending Process

Ink formulation preparations preferably contain 0.25 to 5 weight percent of the inventive additive, the more preferred concentration is 0.5 to 2 weight percent.

As shown above, a skilled artisan will readily recognize that additional additives, such as: dispersing agents, wetting agents, viscosifiers, waxes and other agents can be used with this invention.

The compositions of this invention described above will be used primarily as an additive to inks and most particularly for lithographic inks.

EXAMPLES

Example 1

Preparation of the Polyamide Reaction Product

Empol® 1061 (792.9 grams) was placed in a 2 liter, 4-neck, preweighed reactor equipped with a Barrett distilling receiver and a Friedrichs condenser. The Empol® 1061 was heated to 100° C. and then diethylenetriamine (190.6 grams) was added. The contents were heated to 240° C. under a nitrogen blanket while mixing at 300 RPM. A reaction occurred with the liberation of water, which was collected in a receiver. The reaction was allowed to continue until the acid value was ≦2.0 (mg KOH/gram of reaction mixture). The reaction was halted and the reactor reweighed.

Example 2

Product of Example 1 was allowed to cool to 80° C. under agitation. Reaction product in Example 1 (65 parts) was mixed with tridecyl alcohol (35 parts). The composition was mixed for 15 minutes. The resulting product was poured into an appropriate storage container.

Example 2A

The reaction product of example 1 (65 parts) was mixed slowly at 500 RPM with polypropylene glycol MW 425 (35 parts). The composition was mixed for 15 minutes. The resulting product was poured into an appropriate storage container.

Example 2B

The reaction product of Example 1 (65 parts) was mixed slowly at 500 RPM with polypropylene glycol MW 725 (35 parts). The composition was mixed for 15 minutes. The resulting product was poured into an appropriate storage container.

Example 2C

The reaction product of Example 1 (65 parts) was mixed slowly at 500 RPM with polypropylene glycol MW 2000 (35 parts). The composition was mixed for 15 minutes. The resulting product was poured into an appropriate storage container.

Example 2D

The reaction product of Example 1 (65 parts) was mixed slowly at 500 RPM with 2-octyl dodecanol (Isofol 20) MW 242 (35 parts). The composition was mixed for 15 minutes. The resulting product was poured into an appropriate storage container.

Example 2E

The reaction product of Example 1 (65 parts) was mixed slowly at 500 RPM with 2-decyl tetradecanol (Isofol 24) MW 354 (35 parts). The composition was mixed for 15 minutes. The resulting product was poured into an appropriate storage container.

Example 3

Empol® 1008 (635.2 grams) and Ethomeen® C/15 (692.1 gram) were placed in a 2 liter, 4-neck, pre-weighed reactor equipped with a Barrett distilling receiver and Friedrichs condenser. The contents were heated to 240° C. under a nitrogen blanket while mixing at 300 rpm. The reaction was allowed to continue until the acid value was ≦5.0 (mg KOH/gram of reaction mixture). Once the acid value was ≦5.0, diethylenetriamine (112.6 grams) was charged to the reactor. The reaction continued for another two hours at 240° C. After this time, Amid® HT (164.0 grams) was added to the reactor and cooked for an additional 3 hours at 240° C. The resulting product was poured into storage containers.

Preparation of the Ink Formulation and Testing Procedures

TABLE 2

Heatset Offset Base Ink Formulation

| Component | Generic Name | Supplier | Weight (g) |
| --- | --- | --- | --- |
| Phthalo Blue Flush | Pigment Flush | Magruder | 31.6 |
| Local A7T | Heatset varnish | Lawter | 53.7 |
| Magiesol 470 | Ink Oil | Magie Brothers | 10.5 |
| Wax Compound | Wax additive | Elementis | 4.2 |

Printing ink compositions using the present invention may be prepared by conventional techniques, e.g. by preparing pigment dispersion in an ink varnish or using a pre-dispersed pigment such as pigment flush and the additive. A base ink from the components described on Table 2 is as follows: The ink components without the additive were mixed using a high speed mixer equipped with a Cowles type blade such as Dispermat CV model at 3000 RPM for 15 minutes. The mixture was then allowed to cool to room temperature and equilibrate for 24 hours.

The additives were incorporated to the base ink and mixed for 15 minutes at 4,000 RPM. The blending ratio of the base ink to the rheological additive is 98:2.

After the inks were prepared, they were allowed to equilibrate to room temperature overnight, and the ink properties were measured as described below:

Fineness of grind or ink dispersion was measured on a NP[R] Grindometer G-1 (25 micron) in accordance to ASTM D1316-93.

Viscosity measurements were taken on a fallen rod type viscometer called a "Duke Rheometer" according to ASTM D2052.

Tack of the inks was measured with a Thwing-Albert Electronic Inkometer, Model 101 in accordance to ASTM D4361-89 at 1200 RPM at 90° F. for one minute. Misting was determined by visual observation of the ink collected on a clean 5½"×7" blank white paper placed under the inkometer rollers during the measurement. The misting was interpreted as poor to excellent by visual comparison to a standards chart.

Ink emulsification or water pick-up test was measured with a Duke Emulsification tester Model D-10 in accordance to ASTM D4942-89 using a 5 minute single point water pickup test.

Ink Testing

Example 4

Blank Ink

No Rheological Additive

The components of the base formulation as described in Table 2. Example 4 represents the blank ink without any rheological additive. This ink is considered a "blank ink".

Example 5

Control Ink

Prior Art Organoclay Rheological Additive

A composition of 98 parts of the Example 4 is blended with 2 parts of an organoclay (BENTONE® 760 rheological additive) by using a high speed mixer equipped with a Cowles type blade such as Dispermat CV model at 4000 RPM for 20 minutes. The mixture was then allowed to cool to room temperature and equilibrate for 24 hours.

Example 6

A composition of 98 parts of the Example 4 is blended with 2 parts of the inventive additive from Example 2 (containing 35% tridecyl alcohol) by using a high speed mixer equipped with a Cowles type blade such as Dispermat CV model at 2000 RPM for 10 minutes. The mixture was then allowed to cool to room temperature and equilibrate for 24 hours.

Example 7

A composition of 98 parts of the Example 4 is blended with 2 parts of the additive from Example 3 by using a high speed mixer equipped with a Cowles type blade such as Dispermat CV model at 2000 RPM for 10 minutes. The mixture was then allowed to cool to room temperature and equilibrate for 24 hours.

Example 8

A composition of 98 parts of the Example 4 is blended with 2 parts of the inventive additive as in Example 1 (no tridecyl alcohol) by using a high speed mixer equipped with a Cowles type blade such as Dispermat CV model at 2000 RPM for 10 minutes.

Note that the additive without the tridecyl alcohol was not in a pourable or pumpable form. The product had to be heated to 140° F. to make it pourable before addition into the ink. The mixture was then allowed to cool to room temperature and equilibrate for 24 hours.

Results

TABLE 3

|  | Viscosity (Poise) | Yield Value Dynes/cm² | Misting (Visual) | Water Pick up (%) | Tack (Value) |
|---|---|---|---|---|---|
| Example 4 (Blank) | 64 | 559 | Poor | 24 | 10.1 |
| Example 5 (Control) | 90 | 1021 | Good | 48 | 12.4 |
| Example 6 | 107 | 1197 | Excellent | 20 | 12.3 |
| Example 7 | 116 | 1406 | Good | 100% | 12.7 |
| Example 8 | 156 | 2595 | Good | 75% | 16.4 |

Discussion of Results:

Table 3 shows that Example 6, the inventive additive containing tridecyl alcohol, produced excellent rheological and antimisting properties compared to a traditional rheological additive such as an organoclay, BENTONE® 760, in the Example 5. The water emulsification properties of the inventive additive (Example 6) is acceptable (<50%) whereas that of Examples 7 and 8 are unacceptable and these additives would not be useful in offset ink applications because of their high level water emulsification properties.

Comparative Diluents:

Alternative diluents include but are not limited to high boiling point alcohols such as n-butanol, isobutanol, n-propanol, 2-ethylhexanol, glycol ethers such as butyl glycol, n-hexyl glycol, methyl diglycol, butyl diglycol, phenyl glycol, 1-methoxy-2-propanol, methoxypropxypropanol, 3-butoxy-propanol-2, saturated alcohols such as 2-alkyl-1-alkanols from $C_{12}$ to $C_{26}$ can also be utilized for this application. Polypropylene glycols at various molecular weights from 425 to 4,000 are available. Low molecular glycols such as propylene glycol and polypropylene glycol molecular weight 425 are not suitable due their high water solubility characteristics. The higher molecular weight polypropylene glycols provide the low water solubility and performance properties to ink applications.

The following examples show the performance of low and high molecular weight diluents such as polypropylene glycols and 2-Octyl Dodecanol, Isofol 20 ($C_{20}$) in the inventive product.

Example 9

To 98 parts of the base formulation as described in Table 2 are blended with 2 parts of the inventive additive of Example 2 (containing 35% tridecyl alcohol) mixed by using a high speed mixer equipped with a Cowles type blade such as Dispermat CV model at 2000 RPM for 10 minutes. The mixture was then allowed to cool to room temperature and equilibrate for 24 hours.

Example 10

To 98 parts of the base formulation as described in Table 2 are blended with 2 parts of the inventive additive Example 2A (containing 35% polypropylene glycol diluent; molecular weight 425) mixed by using a high speed mixer equipped with a Cowles type blade such as Dispermat CV model at 2000 RPM for 10 minutes. The mixture was then allowed to cool to room temperature and equilibrate for 24 hours.

Example 11

To 98 parts of the base formulation as described in Table 2 are blended with 2 parts of the inventive additive Example 2B (containing 35% polypropylene glycol solvent, molecular weight 725) mixed by using a high speed mixer equipped with a Cowles type blade such as Dispermat CV model at 2000 RPM for 10 minutes. The mixture was then allowed to cool to room temperature and equilibrate for 24 hours.

Example 12

To 98 parts of the base formulation as described in Table 2 are blended with 2 parts of the inventive additive Example 2C (containing 35% polypropylene glycol solvent; molecular weight 2000) mixed by using a high speed mixer equipped with a Cowles type blade such as Dispermat CV model at 2000 RPM for 10 minutes. The mixture was then allowed to cool to room temperature and equilibrate for 24 hours.

Example 13

To 98 parts of the base formulation as described in Table 2 are blended with 2 parts of the inventive additive Example 2D (containing 35% 2-octyl dodecanol, $C_{20}$ diluent; molecular weight 298) mixed by using a high speed mixer equipped with a Cowles type blade such as Dispermat CV model at 2000 RPM for 10 minutes. The mixture was then allowed to cool to room temperature and equilibrate for 24 hours.

Example 14

To 98 parts of the base formulation as described in Table 2 are blended with 2 parts of the inventive additive Example 2E (containing 35% 2-decyl tetradecanol, $C_{24}$ solvent, molecular weight 354) mixed by using a high speed mixer equipped with a Cowles type blade such as Dispermat CV model at 2000 RPM for 10 minutes. The mixture was then allowed to cool to room temperature and equilibrate for 24 hours.

Results

TABLE 4

|  | Viscosity (Poise) | Yield Value Dynes/cm² | Misting (Visual | Water Pick up % | Tack (Value) |
|---|---|---|---|---|---|
| Example 9 | 107 | 1197 | Good | 20% | 12.3 |
| Example 10 | 118 | 1198 | Good | 71% | 12.4 |
| Example 11 | 107 | 1097 | Good | 58% | 12.3 |
| Example 12 | 107 | 1290 | Good | 20% | 12.4 |
| Example 13 | 134 | 1470 | Good | 28% | 12.8 |
| Example 14 | 136 | 1568 | Good | 26% | 12.9 |

Discussion of Results:

Table 4 shows the comparison of the inventive additive containing tridecyl alcohol, Example 9, to other co-solvents such as C20 and C24 alcohols, polypropylene glycols from low molecular weight of 425 to higher molecular weight of 2000. The lower molecular weight polypropylene glycols, as in Example 10 and Example 11, showed similar rheological properties compared to Example 9; however low molecular weight polypropylene glycols produced excessive water emulsification properties and therefore would find limited use in offset ink applications. Higher molecular weight polyglycols may be utilized as co-solvents due to their low water emulsification properties and their low volatility. The sample prepared with high molecular weight polypropylene glycol 2000 as in Example 12 produced similar rheological and emulsification versus Example 9. Therefore, the higher molecular weight polypropylene glycols can also be utilized for this application.

As seen from the results, the use of diluents is not limited to C13 alcohols.

Additional Ink Testing:

TABLE 5

Sheetfed Offset Base Ink Formulation

| Component | Generic Name | Supplier | Weight (g) |
|---|---|---|---|
| Phthalo Blue Flush | Pigment Flush | Magruder | 31.6 |
| AKO 2035 | Ink varnish | Akzo | 20.0 |
| AKO 2495 | Ink varnish | Akzo | 34.0 |
| Magiesol 52 | Ink Solvent | Magie Brothers | 8.0 |
| Dryer 1 | Cobalt dryer | Mooney | 1.0 |
| Dryer 2 | Mangenese | Nuodex | 1.0 |

A base sheetfed ink from the components described on Table 5 is as follows: The ink components without the additive were mixed using a high speed mixer equipped with a Cowles type blade such as Dispermat CV model at 4000 RPM for 15 minutes. The mixture was then allowed to cool to room temperature and equilibrate for 24 hours.

The additives were incorporated into the base ink and mixed for 20 minutes at 4,000 RPM. The blending ratio of the base ink to the rheological additive is 98:2.

After the inks were prepared, they were allowed to equilibrate to room temperature overnight, and the ink properties were measured as described in the previous page.

Example 15

The Example 15 represents a sheetfed ink formulation as described on Table 5 without any rheological additive. This ink will be called "Blank".

Example 16

A composition of 98 parts of the Example 15 is blended with 2 parts of an organoclay (BENTONE® 760) by using a high speed mixer equipped with a Cowles type blade such as Dispermat CV model at 4000 RPM for 20 minutes. The mixture was then allowed to cool to room temperature and equilibrate for 24 hours.

Example 17

A composition of 98 parts of the Example 15 is blended with 2 parts of the inventive additive Example 2 (containing 35% tridecyl alcohol) mixed by using a high speed mixer equipped with a Cowles type blade such as Dispermat CV model at 4000 RPM for 10 minutes. The mixture was then allowed to cool to room temperature and equilibrate for 24 hours.

TABLE 6

Results

| | Viscosity (Poise) | Yield Value Dynes/cm$^2$ | Misting (Visual) | Water Pick up (%) |
|---|---|---|---|---|
| Example 15 (Blank) | 286 | 2,605 | Fair | 44 |
| Example 16 | 355 | 4,320 | Good | 44 |
| Example 17 | 423 | 6,497 | Excellent | 44 |

Discussion of Results:

Table 6 shows the performance results of the inventive additive containing Example 17 versus the ink containing an organoclay additive in example 16 and the blank ink without any additive in Example 15.

The above results showed that viscosity and yield value of the inventive additive (Example 17) is markedly better than a blank ink (Example 15) as well as an ink containing a conventional organoclay additive (Example 16).

Additional Ink Testing:

The inventive additive was also evaluated as an ink varnish gellant in a hydrocarbon modified rosin ester type ink resin. As shown in the following examples, the inventive additive produced excellent rheological properties compared to a commercially known gellant such as commercially available Manalox 130 (aluminum chelating agent) from OMG Group of Bethlehem, Pa.

The reactive gellants may include aluminum soaps and compounds, organic titanates, oxides/hydroxide of Ca, Mg, Zn and polyamino-acids. The reactive chemical gellants can not be directly added to ink due to heat activation and process requirements. These gellants are rather incorporated into the ink varnishes by heating the varnish to minimum temperature of 150° C. The chemical gellants thicken the ink varnishes by crosslinking the resin.

The inventive product produced excellent rheological properties compared to a commercially known gellant such as Manalox 130 (aluminum chelating agent). The additives were incorporated at 150° C. for 1 hour. The results are listed on the attached Table 7.

Example 18

The composition of the Example 18 represents a commercially available heatset ink varnish supplied by Varchem Chemicals Clifton N.J., Varchem 5110S, without any rheological additive. This will be labeled as "Blank".

Example 19

The heatset ink varnish supplied by Varchem Chemicals Clifton N.J., Varchem 5110S, without any rheological additive in Example 18 (99 parts) is blended with 1 part of a comparative additive, Manalox 130, from Rhodia Company at 150° C. cooking temperature for 60 minutes. The mixture was then allowed to cool to room temperature and equilibrate for 24 hours.

Example 20

The heatset ink varnish supplied by Varchem Chemicals Clifton N.J., Varchem 5110S, without any rheological additive in Example 18 is blended with 2 parts of the inventive additive in Example 2 at 150° C. cooking temperature for 60 minutes. The mixture was then allowed to cool to room temperature and equilibrate for 24 hours.

TABLE 7

| | Duke Viscosity @2.5 sec$^{-1}$ (Poise) | Duke Viscosity @2500 sec$^{-1}$ (Dynes/cm$^2$) |
|---|---|---|
| Example 18 (Blank) | 328 | 157 |
| Example 19 | 4402 | 290 |
| Example 20 | 3108 | 317 |

The present invention overcomes some or all of the shortcomings of the prior art by identifying and providing new thixotropic agents for use in organic based (e.g. oil based and/or resin based) printing ink compositions. The thixotropic agents of the present invention offer the advantage of being usable at room temperature and/or normal processing temperatures which may widely vary and also have been found to bring about desirable improvement in the viscosity and yield value of the printing inks.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

We claim:

1. A printing ink comprising an organic ink vehicle having dispersed therein an ink coloring material and a polyamide additive consisting of a) the reaction product of (i) a dimer fatty acid derived from $C_{16}$ and $C_{18}$ fatty acids; and (ii) a polyamine having an amine functionality of two or more; and b) a low volatility liquid alcohol which has a water solubility of less than 10 mg/L.

2. The printing ink of claim 1 wherein the polyamine is a polyethylene polyamine.

3. The printing ink of claim 1 wherein said additive comprises from 0.1% to 10% by weight of said printing ink.

4. The printing ink of claim 1 wherein said additive comprises from 1.0% to 3.0% by weight of said printing ink.

5. A lithographic ink comprising a polyamide additive consisting of a) the reaction product of (i) a dimer fatty acid derived from $C_{16}$ and $C_{18}$ fatty acids, and (ii) a polyamine having an amine functionality of two or more; and b) a tridecyl alcohol.

* * * * *